Dec. 24, 1940.　　　J. W. PLATT　　　2,226,502
CHAIN BRACKET
Filed June 8, 1939
Fig. 1.
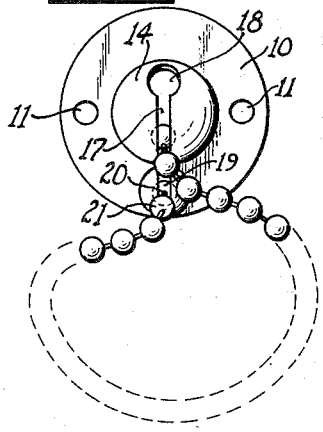
Fig. 8.
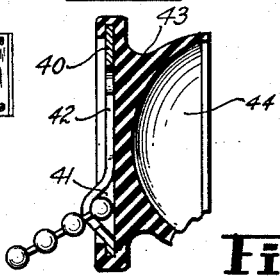
Fig. 2.
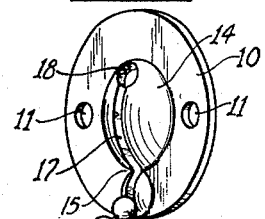
Fig. 3.
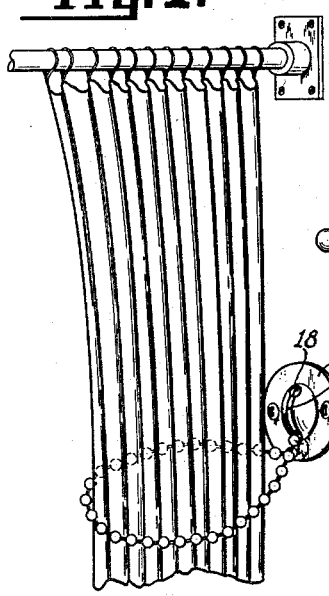
Fig. 6.
Fig. 4.
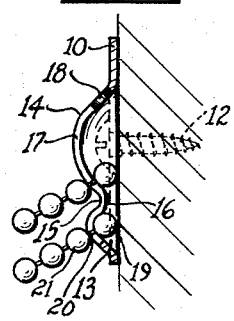
Fig. 7.
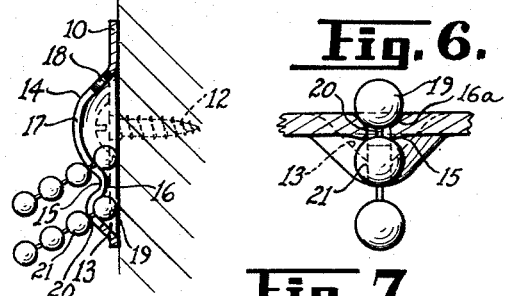
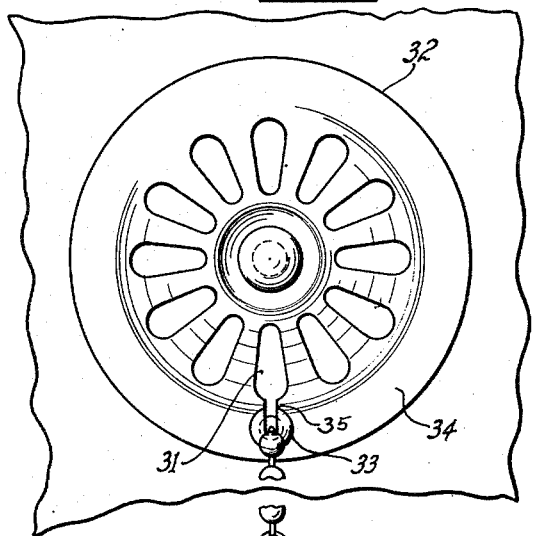
Fig. 5.
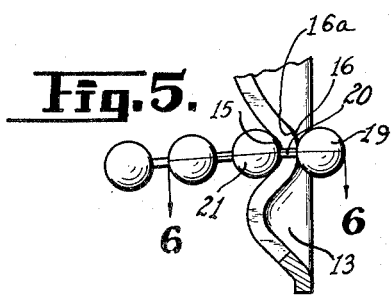
INVENTOR
John W. Platt.
BY A. T. Sperry
ATTORNEY Patented Dec. 24, 1940

2,226,502

UNITED STATES PATENT OFFICE 2,226,502

CHAIN BRACKET

John W. Platt, Waterville, Conn., assignor to Scovill Manufacturing Company, Waterbury, Conn., a corporation of Connecticut Application June 8, 1939, Serial No. 277,979

10 Claims. (Cl. 24—116)

This invention relates to chain brackets and is particularly concerned with a bracket for retaining at least one end of a chain formed of connected spherical links, commonly known as bead chains.

It is among the prime objects of the invention to provide a bracket of improved simplicity of structure, the inventive concept hereof being in most instances susceptible of embodiment in a single one piece stamping.

Another important object of the invention is to provide a novel, simple and efficient chain bracket which is so constructed that by its attachment to a supporting means such as a wall or the equivalent, the combination will be such as to permanently secure one end of a bead chain so as to positively preclude displacement of the chain from the bracket so long as the bracket is applied to its supporting medium.

A further object is to provide a bracket to which the end bead of a bead chain may be readily applied and which, after application will retain the same precluding accidental displacement of the chain from the bracket so that chain and bracket may be delivered in assembled form with minimum danger of chain and bracket being separated during handling and shipping.

Another object is to provide a bracket which not only permanently retains one end of a bead chain, but which is also adopted to removable receive and retain the opposite end of the chain so as to provide an assembly particularly adopted for use as a curtain "tie back" or the like.

Obviously the inventive concept here illustrated may be incorporated in various devices, although being particularly adopted to plumbing fixtures where the bracket may be formed as a bath tub or sink overflow escutcheon, shower curtain "tie back" or like bath room appurtenance. Thus the invention is in no way limited to the specific form illustrated in the accompanying drawing, in which:

Figure 1 is a perspective view of one form of the invention being utilized as a shower curtain "tie back."

Figure 2 is an enlarged perspective view of that form of the invention as shown in Figure 1.

Figure 3 is a vertical sectional view of the device of Figure 2.

Figure 4 is a front elevation of the device of Figure 2.

Figure 5 is a detail vertical sectional view of the bead retaining section of the device of the foregoing figures.

Figure 6 is a sectional view taken on line 6—6 of Figure 5.

Figure 7 is a front elevation of the invention as embodied in an overflow escutcheon, and Figure 8 is a further modification of the invention as coupled with a resilient suction cup support.

The various forms and modifications of the invention are each characterized by a slotted plate, the slot of which is at one portion wide enough to receive therethrough the end bead of a bead chain. In each instance, a narrower portion of the slot leads into a cupped portion of the plate which receives the end bead the dimensions of the cup being such as to receive the bead in its entirety so that the plate may be secured flush against a supporting element whereby the supporting element will close the open face of the cup and preclude displacement of the end bead therefrom.

The present invention also embraces the use of a plate formed to have a curved or angled cross section through which the slot extends, the degree of angle or the amount of curvature and/or the relation of thickness of material to the spacing of the beads of the chain being such that to pass a link of the chain through the angled or curved portion will require a pivotal movement of the chain utilizing a bead of the chain as a fulcrum. With this inventive concept it may be desirable to maintain at least a portion of the curve or angle over which the bead passes at a radius equal to the radius of the bead plus the distance between beads thus forming a throat, the wall of which will present a frictional resistance to the passage of the beads requiring a squeezing or snapping of the bead through the passage.

Referring now particularly to that form of the invention shown in Figures 1 to 6 inclusively, the bracket is preferably formed, by stamping or otherwise, from a single disk of material and is formed to provide an annular flat flange, 10, which may be pierced as at 11 to receive therethrough securing screws 12 as shown in Figure 1. The flange 10 is also formed with pocket 13 which is here shown as spherical and formed by pressing forwardly the material of the flange. The size of the pocket is sufficient to wholly receive the end bead of the chain so that when the bead is in the pocket, the flange may be secured to a flat surface as shown in Figures 1 and 3 and when so secured, the bead will be retained in the pocket and prevented from displacement therefrom.

The center of the plate is also pressed outwardly to form a circular central dome 14, the periphery of which tangentially intercepts the periphery of the pocket 13. The outer face of the plate, therefore, forms a reverse curve surface 15 between the outer faces of dome 14 and the outer surface of pocket 13 and a similar inner curved surface 16.

Extending across the dome 14, and leading into the pocket 13 is a key hole slot 17 terminating at one end is an enlarged opening 18 of sufficient size to permit easy passage therethrough of the end bead 19. The slot extends from the opening 18 across the top of the dome 14 intersecting surfaces 15 and 16 and across the pocket 13 terminating slightly below the middle of the pocket. The width of the slot is, of course, less than the cross section of the beads, but is sufficient to permit free passage therethrough of the link 20, joining the end bead 19 with the second bead 21.

By reference now more particularly to Figures 3 and 5, it will be seen that the structure herein before described provides a slot convexly curved in its traverse of dome 14 and pocket 13 but concavely curved in its traverse of the surfaces 15 and 16. It will be noted that while the end bead may be inserted in the opening 18 and the link 20 may easily pass down the slot in a horizontal position such simple movement is precluded when the second bead 21 reaches the surface 15 as shown in Figure 5. As shown in Figures 5 and 6, the spacing between surfaces 15 and 16 is as close an approximation of the distance between bead surfaces as may conveniently be had while utilizing normal production methods such construction provides a throat, the walls of which will frictionally resist passage of the beads thereover. As shown, the throat edges of the surface 16 may be beveled as at 16A (Figure 6) to provide for exact fitting of the surfaces to the link length.

From a consideration of the drawing and the foregoing description, it will be seen that since the inner surface 16 is a radius equal the combined radius of the bead 21 and the distance between the beads 19 and 21 and since the thickness of material is equal to the difference between the beads, the end bead 19 can move into the pocket 13 only by pivotal movement over the arcuate surface 16 using the bead 21 as a pivot while it is seated in the surface 15 pressure being applied to overcome friction and to squeeze or snap the bead into the cup 13. With bead 19 in cup 13, the bead 21 and link 20 may now use bead 19 as a fulcrum and the bead 21 will thus move over the outer surface of the cup 13 and come to rest in its normal position as shown in Figures 2 and 3. The assembly of chain and bracket is now ready for delivery and in view of the pivotal movements required for assembly, accidental displacement is practically impossible. The squeezing action required will further preclude the possibility of such accidental displacement.

In Figure 7 of the invention is disclosed as applied to an outlet escutcheon for both tubs and sinks or the like, the chain being utilized to anchor the stopper 30. In this use of the invention, one of the usual louvers 31 of the escutcheon plate 32 is used for the slot, the pocket 33 in the flange 34 being pressed forwardly to provide the curved path of the slot. At 35 the throat may be formed as shown in Figures 5 and 6. It will be seen that with the end bead inserted in the pocket 33 and the escutcheon applied, the supporting surface will positively secure the bead within the pocket. The curved characteristics of the slot will as in the case of the form of the invention previously disclosed, prevent accidental displacement of the bead during delivery.

Referring to Figure 8 of the drawing it will be seen that the invention is not restricted to a bracket having a central dome, but that a flat plate 40 may be provided with the pocket 41 and the slot 42. This form of the invention also illustrates that the plate is not limited to one designed for direct attachment to wall or other stationary support. In this instance the plate is mounted in a composition block 43, preferable of rubber and having a suction cup 44 designed for removable attaching the bracket to any desired wall or fixture. This form of the invention further illustrates that the invention is not limited to the circuitous characteristics of the slot since in this instance the assembly of the plate to the block permanently secures the end bead in position precluding the possibility of accidental displacement during shipment.

From the foregoing, it will be seen that the present invention is applicable to many forms of devices and it is obvious that numerous changes modifications and the full use of equivalents may be resorted to without departure from the spirit or scope of the invention as outlined in the appended claims.

I claim:

1. A bead chain bracket, comprising a plate, having a slot one portion of which is of sufficient width to receive therethrough the end bead of a bead chain and having a narrower portion leading therefrom, said plate having a pocket formed therein to which said narrower portion of said slot extends, said pocket being of sufficient size to wholly receive said end bead and a supporting block for said plate which will close said pocket and thus secure said bead against displacement therefrom.

2. A bead chain bracket comprising a member provided with an opening therein through which a bead of a bead chain may be passed, said member having a pocket formed therein and spaced from said opening and also having a slot formed therein which is narrower than said opening and extends from said opening to said pocket, and means formed on said member located between said pocket and opening and adjacent said slot for retaining a bead in said pocket.

3. A bead chain bracket adapted to be attached to a support comprising a member having means thereon for engaging a support, said member being formed with a rearwardly facing pocket so positioned with respect to said means as to be substantially closed by the support to which the bracket is attached, said member having an opening therein spaced from said pocket and also having a slot formed therein which is narrower than said opening and extends from said opening to said pocket for locating a bead in the pocket prior to attachment of the bracket to a support.

4. A bead chain bracket adapted to be attached to a support comprising a member having an opening therein through which a bead of a bead chain may be passed, means on said member presenting a surface lying in a plane and positioned to engage a support to which the bracket is to be attached, said member being formed with a rearwardly facing pocket spaced from said opening and positioned to be substantially closed by the support to which the bracket is attached, said member also having a slot formed therein which is narrower than said opening and extends from said opening to said pocket, the portion of said member between the pocket and said opening and adjacent said slot extending toward the plane in which said means are located and serving to prevent removal of a bead from said pocket when said means are in engagement with a support.

5. A bead chain bracket adapted to be attached to a support comprising a member formed with two pockets therein one of which pockets is provided with an opening for receiving the terminal bead of a bead chain, said member also being formed with a slot communicating with said opening and extending to the other pocket to permit movement of the terminal bead from the pocket having an opening therein to the other pocket, and means on said member presenting a rearwardly facing surface lying in a plane and adapted to engage a support, the portion of said member between said pockets and adjacent said slot extending toward said plane and serving to retain the terminal bead in said other pocket when said bracket is attached to a support.

6. A bead chain bracket adapted to be attached to a support comprising a member having a central domed portion provided with an opening therein through which the terminal bead of a bead chain may be passed, and having an attachment flange surrounding said domed portion and adapted to engage a support for the bracket, said flange being formed with a pocket therein positioned to be substantially closed by the support to retain the terminal bead therein, said member also having a slot therein which is narrower than said opening and extends from said opening in said domed portion to said pocket for locating the terminal bead in said pocket prior to attachment of the bracket to a support.

7. A bracket for a bead chain comprising a member which is generally circular in shape and provided with a central, hollow, domed portion and a marginal flange surrounding said central domed portion and presenting a rearwardly facing surface lying in a plane and adapted to engage a support to which the bracket is to be attached, the flange being formed with a rearwardly facing pocket the edge of which intersects the edge of the central domed portion of the member, said member also being formed with an opening in the domed portion thereof for receiving the terminal bead of a chain and having a slot narrower than said opening extending from said opening to said pocket through the intersecting edges of the domed portion and pocket to permit movement of the terminal bead of a chain from said domed portion to said pocket, that portion of the member where the edges of the domed portion and pocket intersect extending toward the plane of said flange so as to lie closely adjacent said plane and prevent removal of the terminal bead from said pocket when said flange is in engagement with a support.

8. In combination with a bead chain, a bracket adapted to receive and retain the terminal bead of the chain, said bracket being formed with a marginal portion presenting a rearwardly facing surface lying in a plane and adapted to engage a support, said bracket being formed with two pockets one of which is provided with an opening of greater diameter than said terminal bead and the other of which is spaced from said opening and connected therewith by a portion having a slot which is narrower than the terminal bead, the portion of said bracket between said pockets and adjacent said slot extending toward the plane of said marginal portion and spaced from said plane a distance less than the diameter of said terminal bead to retain the terminal bead in the other pocket when the marginal portion of the bracket is in engagement with a support.

9. In combination with a bead chain, a bracket adapted to receive and retain the terminal bead of the chain, said bracket being formed with two rearwardly facing pockets one of which has an opening therein through which the terminal bead may be inserted and the other of which is spaced from said opening and connected thereto by a portion having a slot which is narrower than said terminal bead, the portion of said bracket between said pockets and adjacent said slot having a rearwardly facing surface with a radius of curvature approximately equal to the radius of the terminal bead plus the distance from the surface of the terminal bead to the surface of the next adjacent bead on the chain.

10. In combination with a bead chain, a bracket adapted to receive and retain the terminal bead of said chain comprising a member having a central domed portion with an opening therein through which the terminal bead may be passed, means on said member forming a pocket for receiving and holding the terminal bead, said member having a slot which is narrower than the terminal bead formed therein and communicating with said opening and extending to said pocket to permit the passage of the terminal bead from said domed portion to said pocket, that part of the member between the domed portion of the member and the pocket and adjacent the slot being depressed and presenting an outer surface having a radius of curvature approximately equal to the radius of the bead of said chain adjacent said terminal bead and the opposite surface of said part having a radius of curvature substantially equal to the radius of said adjacent bead plus the distance between the terminal bead and the adjacent bead, whereby the passage of the terminal bead back and forth between the domed portion of said member and the pocket requires the use of the adjacent bead as a fulcrum to move the terminal bead past the depressed part of said slot.

JOHN W. PLATT.